Nov. 3, 1970  J. R. CALLANAN  3,537,698
ELECTRICAL OUTLET BOX MOUNTING JIG
Filed Nov. 1, 1968  2 Sheets-Sheet 1
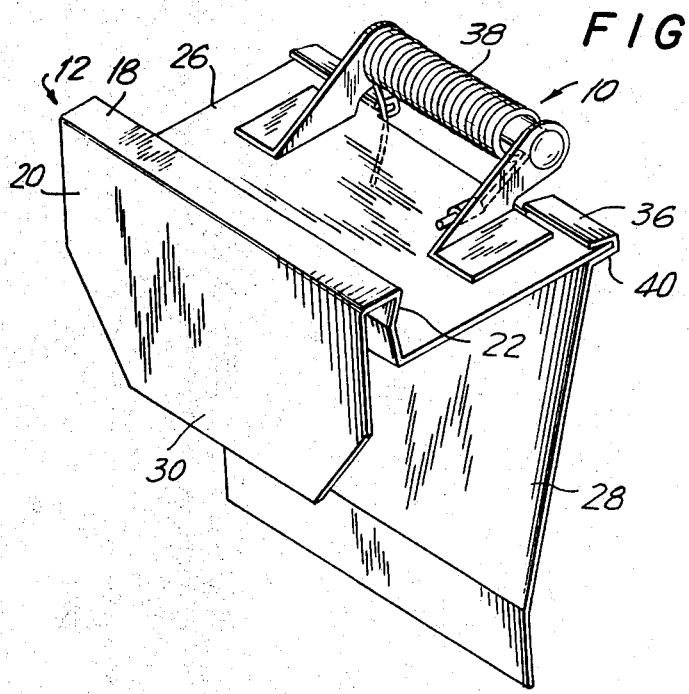
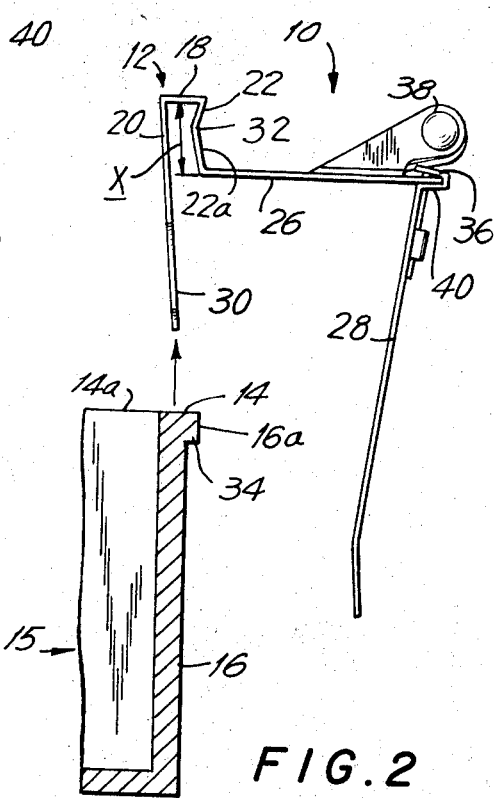
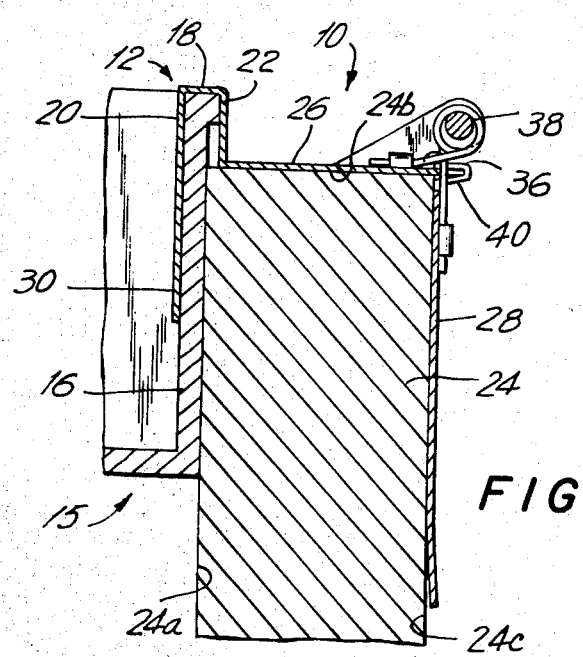
INVENTOR.
JOSEPH R. CALLANAN
BY
Curtis, Morris & Safford
ATTORNEYS

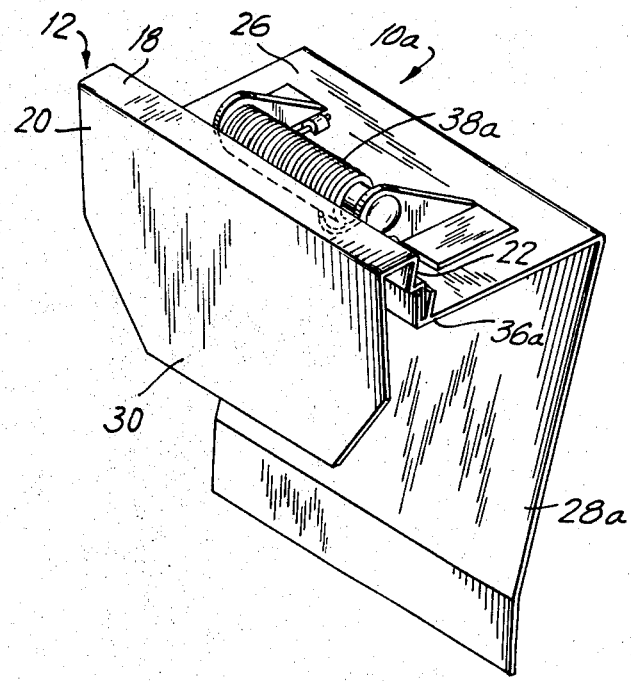
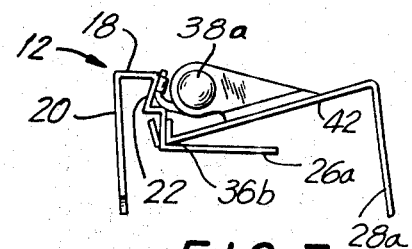
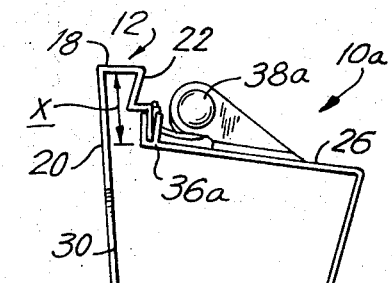
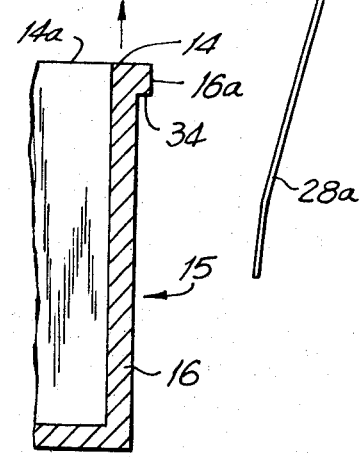
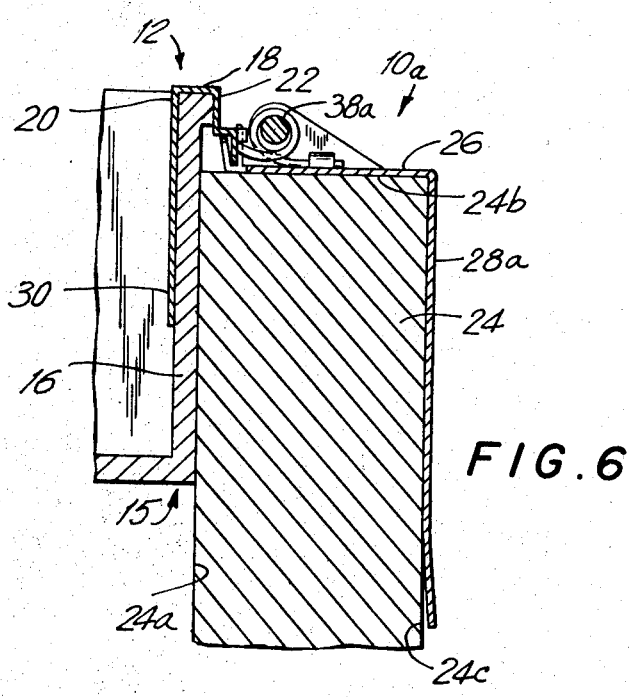

United States Patent Office 3,537,698
Patented Nov. 3, 1970

3,537,698
ELECTRICAL OUTLET BOX MOUNTING JIG
Joseph R. Callanan, Whitman, Mass., assignor to Cal-Tav, Inc., Cambridge, Mass.
Filed Nov. 1, 1968, Ser. No. 772,565
Int. Cl. B25b 5/04, 5/06
U.S. Cl. 269—98                                      10 Claims

ABSTRACT OF THE DISCLOSURE

A jig for mounting electrical outlet boxes to building wall and ceiling members having a three-sided open loop section adapted to grasp a wall of an outlet box, an alignment arm section extending from the loop section to align the box and jig on a building member, and a leg member section extending from adjacent the arm section to hold the jig and box on a building member.

---

This invention relates to a device for mounting electrical outlet boxes, and more particularly to a sturdy, inexpensive, re-usable jig that quickly and easily can be slipped onto an electrical outlet box with which it can be mounted on a building member, such as a stud or joist, of a building under construction to align the box accurately for securing the box to the building member, and then readily can be removed from the box and the member.

Outlet boxes ordinarily are mounted in new buildings, for example houses, on wall studs or joists over which a lath and plaster or a drywall construction is placed to form the interior walls or ceilings. The open end of the box, into which later is placed a fixture, receptacle or switch, must extend outwardly from the stud or joist an amount about equal to the wall or ceiling thickness so that the exposed portion of the box will be flush with the wall or ceiling. Also, the box must be aligned vertically or horizontally so the edges of the opening project an equal distance from the front face of the stud or joist.

Hand mounting of electrical boxes is difficult and time consuming because at least one hand must be used to hold the box as it is secured, e.g., by nails, to a building member. The box often slips, or inadvertently is moved by the worker's hand, and is misaligned. A house might have as many as twenty or more electrical outlets, so that the time involved properly to hand mount the outlet boxes, and to re-mount misaligned ones, is considerable.

Numerous devices have been created to align or to hold and align electrical outlet boxes as they are secured to studs or joists. Many such devices have been patented, for example, in U.S. Pats. No. 2,802,634, No. 2,990,172 and No. 3,154,304. In general, however, the previous devices have serious shortcomings. Some are permanently affixed to the box or stud, and thus are not reusable. Others are of relatively complex construction, having a multiplicity of parts many of which are movable, and thus are both expensive to make and very subject to wear and breakage.

It is an object of this invention to provide an improved electrical outlet box mounting jig. Another object of this invention is to provide an outlet box mounting jig that is readily attached to the box, simple to place on a stud or joist, accurately and positively aligns and holds the box against the stud or joist, and is easily removed from both the box and stud or joist for re-use, all in a comparatively short amount of time. A further object of this invention is to provide a jig of the type described that has a relatively simple design and construction, without a multiplicity of parts, particularly moving parts. These and other objects of this invention will be in part discussed in, and in part apparent from, the following more detailed disclosure.

The present invention can be understood more thoroughly by reference to the accompanying drawings, in which like reference numerals identify corresponding elements, and in which:

FIG 1 is a perspective and shows an embodiment of an electrical outlet box mounting jig according to this invention;

FIG. 2 is a section and shows the jig of FIG. 1 and its relation to an outlet box;

FIG. 3 is a section and shows an outlet box mounted and aligned on a building member by the jig of FIG. 1;

FIG. 4 is a perspective and shows another embodiment of an electrical outlet box mounting jig according to this invention;

FIG. 5 is a section and shows the jig of FIG. 4 and its relation to an outlet box;

FIG. 6 is a section and shows an outlet box mounted and aligned on a building member by the jig of FIG. 4.

Broadly, a jig 10 according to this invention has an open loop section 12 that is adapted to extend over and embrace an edge 14 of one side wall 16 of an electrical outlet box 15 (partially shown in the drawings). The open loop 12 of the jig 10 is pressed over the wall edge 16 until the closed end 18 of the loop is uniformly against the edge 14. The sides 20, 22 of the open loop 12 press against the sides of the wall 16 and firmly hold the box 15. The loop 12 fits over the wall edge 14 an amount X equal to the distance the outlet box 15 is to project out from the face 24b of a building member 24 such as a joist or stud, i.e., the thickness of the interior wall or ceiling construction to be placed on the building member.

Extending from one side 22 of the open loop section 12 is an alignment arm 26. The plane of the arm is substantially parallel to the plane of the closed end 18 of the loop 12. To align a box 15 on a building member, the box is placed against one side 24a of the stud or joist 24 and the alignment arm 26 of the jig is pushed flush against the outer face 24b of the stud or joist. Thus the periphery 14, 14a of the open end of the box uniformly projects the desired distance X beyond the building member, and the box is accurately and positively aligned for mounting.

To hold an aligned box 15 against a building member 24 during mounting, a leg member 28 extends from adjacent the arm 26 at an end thereof. The leg member 28 serves to apply pressure against the side 24c of the building member opposite the side wall 16 of the box 15, and thus, in effect, to clamp the box 15 and jig 10 to the member. Mounted in that fashion, the outlet box can be fastened to a stud or joist without having to hold the box by hand.

For ease of placing the open loop section 12 over the side wall edge 14 of the box 15, a tab section 30 optionally extends from the side wall 20 of the loop 12 opposite the arm 26. The tab section 30 also serves to prevent any tendency of the box 15 to rotate, in the loop 12, away from the building member 24, and thus is a desirable feature of the instant jigs.

FIGS. 3 and 6 illustrate the profile of a jib 10, 10a, on a box and a building member, in what can be called a distended holding condition. One end of the side wall 22 of the open loop 12 tends to close in toward the other side wall 20. Inasmuch as the jig 10, 10a is made of a resiliently flexible flat material, for example, a spring steel or a synthetic plastic having similar properties, the side walls 20, 22 of the loop can be spread apart to receive the edge 14 of the box wall 16 and, in that operative condition, exert a pressure against the box wall to hold the box 15 firmly. Similarly, the leg member 28 in the free condition shown in FIGS. 2 and 5 is substantially in a plane somewhat at less than a right angle to the alignment arm 26, and tends to close toward the loop 12. In a manner to be described, it can be spread outwardly for positioning on a stud or joist 24 against which it exerts a pressure to hold the jig 10, 10a and the box 15 firmly until the box is fastened. Thereafter the jig is quickly and easily removed by grasping the loop 12 and pulling the jig off both the joist or stud and the box.

A feature of a preferred embodiment of the invention also is illustrated in the drawings, e.g., FIG. 2. The side wall 22 of the open loop section 12 attached to the arm section 26, and adapted to bear against the exterior face 16a of the wall 16 of an outlet box, has at the end adjacent the arm 26 a portion 22a turned away from the opposite wall 20 of the loop. The line of the turn, or bend 32, in the wall corresponds to a lip 34 around the periphery 14, 14a of the opening of many outlet boxes. The lip 34 reinforces the opening, especially of boxes made of relatively brittle material, such as Bakelite. As the loop 12 is passed over the edge 14 of the box 15, and the line of the turn 32 in the side wall 22 passes beyond the lip 34, the box tends to snap into place in the loop. The snapping movement usually is accompanied by a distinct sound, often a musical sound if the jig is made of a metal such as steel. The snap movement and the sound signal positively that the box 15 is firmly and properly mounted in the jig 10.

In the embodiment of the invention illustrated in FIGS. 1, 2 and 3, the leg member 28 is pivotally mounted by any convenient pivot means 36 adjacent the end of the alignment arm 26 opposite the open loop section 12. The latter two elements 12, 26 preferably are formed from a single piece of flat flexibly resilient material, as is the leg member 28. A spring means 38 serves to bias the leg member 28 against a stop means 40 in the free position shown in FIGS. 1 and 2, and to apply the leg member 28 firmly against the face 24c of the building member 24 in the operative holding position shown in FIG. 3. In the embodiment of the invention illustrated in FIGS. 4, 5 and 6, the leg member 28a is rigidly fastened, preferably integrally, to said alignment arm 26, which is pivotally secured by pivot means 36a adjacent the end of alignment arm 26 attached to the open loop section 12. Spring means 38a serve to bias the leg member as previously described. In a modified form of the latter embodiment, shown in FIG. 7, the alignment arm 28a is swingably attached from an extension arm 42 secured by pivot means 36b adjacent the end of alignment arm 26a attached to the open loop section 12.

It is of course to be understood that numerous changes can be made in the design and structure of the jigs of this invention without departing from the scope of the invention as disclosed herein before and as defined in the following claims.

I claim:

1. A jig for mounting electrical outlet boxes which comprises: and open loop section having a closed end, a first side wall extending from one side of said closed end, and a second side wall extending from the opposite side of said closed end, said open loop being adapted to fit over an edge of and to bear firmly against a side wall of an electrical outlet box to hold said box in said jig; an alignment arm extending laterally outward from one of said side walls of said open loop section and being adapted to bear against the face of a building member to which said outlet box is to be fastened; a swingably mounted leg member extending from adjacent an end of said alignment arm in the direction of the open end of said open loop section, said leg member being adapted to bear firmly against said building member on the side thereof opposite an outlet box mounted in said jig and to hold said jig and said box onto said building member; pivot means attached to said leg member swingably fastening said leg member adjacent an end of said alignment arm; and spring means biasing said leg member toward said open loop section.

2. A jig for mounting electrical outlet boxes according to claim 1 wherein said open loop section and said alignment arm are a single piece of a flat flexibly resilient material bent to form said section and said arm.

3. A jig for mounting electrical outlet boxes according to claim 1 wherein said leg member is swingably fastened by said pivot means adjacent the end of said alignment arm opposite said open loop section.

4. A jig for mounting electrical outlet boxes according to claim 1 wherein said leg member further comprises an extension portion at the end of which it is swingably fastened by said pivot means at the end of said alignment arm adjacent said open loop section.

5. A jig for mounting electrical outlet boxes according to claim 1 wherein said leg member is rigidly fastened to said alignment arm adjacent the end opposite said open loop section, and is swingably fastened by said pivot means to said open loop section adjacent the other end of said alignment arm.

6. A jig for mounting electrical outlet boxes according to claim 1 wherein said second side wall of said open loop section extends from the closed end thereof an amount substantially equal to a predetermined distance said outlet box is to project out from said building member, and said alignment arm extends from adjacent the end of said second side wall.

7. A jig for mounting electrical outlet boxes according to claim 1 wherein said first and second side walls of said open loop section, in an undistended condition, are closer together at the open end of said loop than adjacent said closed end thereof.

8. A jig for mounting electrical outlet boxes according to claim 1 wherein said leg member, in a free condition, is at less than a right angle to said alignment arm.

9. A jig for mounting electrical outlet boxes according to claim 1 wherein a first portion of the side wall of said open loop section from which said alignment arm extends is, in an undistended condition, at less than a right angle to said closed end of said loop, and a second portion of said side wall is at an angle to said first portion away from the other of said side walls.

10. A jig for mounting electrical outlet boxes according to claim 1 which further comprises a tab section extending from the side wall of said open loop section opposite said alignment arm substantially in the plane of said side wall.

References Cited

UNITED STATES PATENTS

| | | |
|---|---|---|
| 1,069,134 | 8/1913 | Hatzfeld. |
| 2,956,798 | 10/1960 | Briggs. |
| 3,434,686 | 3/1969 | Yoshizaburo Aoi __ 211—45 XR |

ROBERT C. RIORDON, Primary Examiner

D. D. EVENSON, Assistant Examiner

U.S. Cl. X.R.

220—36; 248—27